US006460926B1

United States Patent
Neale (10) Patent No.: US 6,460,926 B1
(45) Date of Patent: Oct. 8, 2002

(54) TRANSPARENT HEAD RESTRAINT ASSEMBLY

(76) Inventor: Colin G. Neale, 39473 Village Run Dr., Northville, MI (US) 48167

(*) Notice: Subject to any disclaimer, the term of this patent is extended or adjusted under 35 U.S.C. 154(b) by 0 days.

(21) Appl. No.: 09/701,853
(22) PCT Filed: Jun. 4, 1999
(86) PCT No.: PCT/CA99/00555
§ 371 (c)(1),
(2), (4) Date: Dec. 1, 2000
(87) PCT Pub. No.: WO99/62739
PCT Pub. Date: Dec. 9, 1999

Related U.S. Application Data (60) Provisional application No. 60/088,323, filed on Jun. 4, 1998.

(51) Int. Cl.[7] .................................................. B60N 2/42
(52) U.S. Cl. ................................. 297/216.12; 297/404
(58) Field of Search ........................... 297/391, 216.12, 297/216.1, 404

(56) References Cited

U.S. PATENT DOCUMENTS 5,255,955 A * 10/1993 Matosic

FOREIGN PATENT DOCUMENTS

| CH | 588 957 | | 6/1977 |
| CH | 608 751 | | 1/1979 |
| DE | 2441165 | * | 3/1976 |
| DE | 27 34 049 | | 2/1979 |
| DE | 27 43 609 | | 4/1979 |
| FR | 2291057 | * | 6/1976 |
| FR | 2 421 753 | | 11/1979 |

* cited by examiner

Primary Examiner—Milton Nelson, Jr.
(74) Attorney, Agent, or Firm—Clark Hill PLC (57) ABSTRACT

A transparent head restraint assembly for use on a vehicle seat includes a seat cushion assembly and a seat back assembly pivotally attached to the seat cushion assembly. The head restraint assembly includes a generally U-shaped frame member fixedly secured to the upper portion of the seat back assembly. The frame member forms the outer perimeter of the head restraint and defines an inner opening. A transparent head restraint member of plastic, glass or a combination thereof is seated in the opening of the frame member and a mounting member secures the transparent head restraint member to the frame member. The frame member comprises a tubular member surrounded by a resilient padding structure. The mounting member comprises a groove formed in the padding structure for receiving and supporting an edge of the transparent head restraint member and providing resilient absorption of impact forces on the head restraint member.

20 Claims, 11 Drawing Sheets

TRANSPARENT HEAD RESTRAINT ASSEMBLY

This application is a 371 of PCT/CA99/00555 filed Jun. 4, 1999 which claims benefit of provisional application No. 60/088,323 filed Jun. 4, 1998.

TECHNICAL FIELD

The subject invention relates to a transparent head restraint.

DESCRIPTION OF THE PRIOR ART

Head restraint structures mounted on vehicle seats are well known. A wide variety of well known types of vehicle seats are used in motor vehicles including bucket seats which accommodate one passenger, and bench seats which accommodate a plurality of passengers. Both two-passenger and three-passenger bench seats are well known. Vehicles seats are typically arranged in a plurality of rows in the vehicle interior. Sports utility-type vehicles and van-type vehicles, for example, frequently have a first row of seats comprised of two bucket seats and a second and third row (or more) of bench seats behind the first row.

Head restraint structures for protecting the head and neck of seat occupants during a vehicle accident are well known in the art and are usually mounted on each seat in a vehicle. The structure and operation of conventional head restraint structures are a source of many problems in vehicle construction and operation. Conventional head restraint structures assume a variety of structural configurations and are commonly constructed of metal, plastic, and foam-like material. Head restraint structures must be constructed to meet many government and OEM requirements, including requirements for cost, weight, safety, and interference with the vehicle driver's rearward vision. It can be appreciated that these requirements are frequently in conflict. A small, light-weight and inexpensive head restraint structure, for example, may reduce cost and increase a driver's rearward visibility, but may compromise seat occupant safety, especially during vehicle accidents involving angular impacts. Likewise, the converse may also be true in certain situations.

Conventional head restraint structures are typically vertically and angularly adjustable. This adjustability can also compromise occupant safety. More specifically, most conventional head restraint structures must be properly positioned vertically for each individual passenger to afford maximum passenger protection during a vehicle accident. Because most head restraint structures are adjustable, however, if the restraint structure is not readjusted for each successive occupant of a particular seat, the head restraint structure may be deployed in an ineffective or hazardous position for a particular occupant during a collision.

Conventional head restraint structures, particularly the head restraint structures on second and third row seating also cause problems with a driver's vision in situations where he must look towards the rear of the vehicle. Vehicles with three-abreast seating for the second or third rows often have three head restraint structures mounted on the bench seat. These head restraints can restrict the rearward vision of the driver although statistics show that these seats are rarely occupied.

One solution contemplated by the prior art to overcome the restrictions of rearward vision for the driver is to provide a transparent head restraint assembly such as shown in German Patent No. 27 34 049. The transparent head restraints known in the prior art are fixedly secured to a headrest frame or to a rigid mounting structure on the headrest frame. Hence, although the transparent head restraint itself may flex or move, the mounting structure does not provide any resiliency when impact forces are experienced by the head restraint. The rigid mounting structures therefore limit the absorption characteristics of the head restraint assembly.

SUMMARY OF THE INVENTION

The problems associated with conventional head restraint structures can be overcome by providing one or more (preferably all) vehicle seats in a vehicle with a transparent head restraint assembly including a resiliently mounted panel of transparent material which functions as a passenger head restraint. The transparent head restraint assembly according to the present invention can be included in both bucket seats and bench seats. Head restraint structures which incorporate transparent panels can be constructed to meet or exceed design requirements for passenger safety, vehicle weight, and construction costs. In particular, the transparency of the head restraint ensures that the driver's rearward vision will not be interfered with.

According to one aspect of the invention, there is provided a transparent headrest restraint assembly for use on a vehicle seat comprising a frame member adapted for securing a head restraint member to the vehicle seat. The frame member forms an outer portion of the head restraint assembly and defines an inner opening. A transparent head restraint member is seated in the opening of the frame member and a mounting structure is disposed between the transparent head restraint member and the frame member for securing the transparent head restraint member to the frame member.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
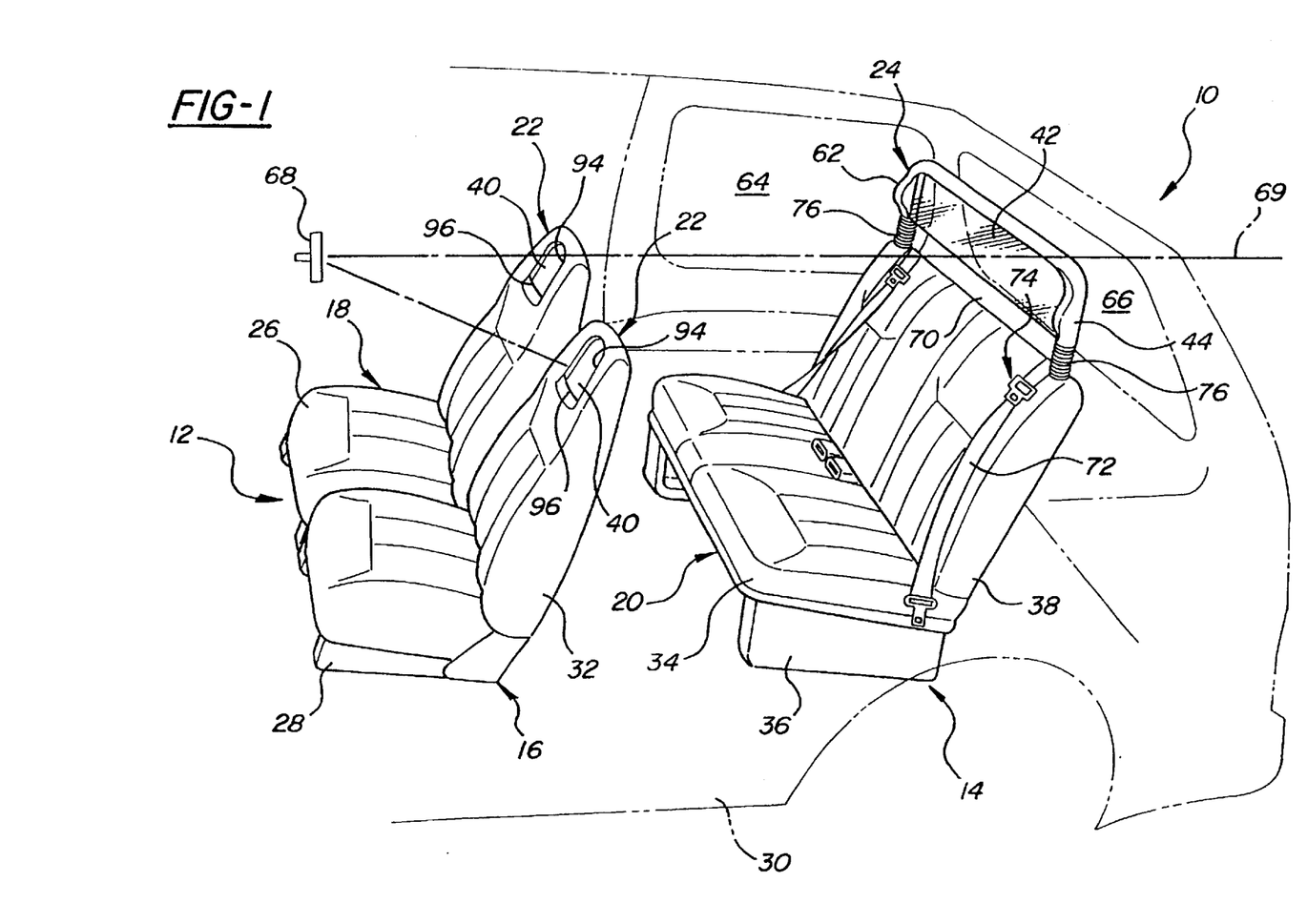
FIG. 1 is a fragmentary perspective view of an interior portion of a sports utility-type vehicle showing a plurality of seats therein, including a plurality of bucket seats in a first row of vehicle seating and a bench seat in a second row of vehicle seating, each of which includes a transparent head restraint assembly according to the present invention.

Referring now to FIG. 1, there is shown therein a fragmentary view of an exemplary sports utility-type vehicle, generally designated 10, which includes a first row 12 of vehicle seats and a second row 14 of vehicle seats. The first row 12 is comprised of identical bucket seats including a left side bucket seat 16 and a right side bucket seat 18 (these reference directions are considered from the point of view of a forwardly facing seat occupant). The second row 14 includes a two passenger bench seat 20. Each bucket seat 16, 18 incorporates a transparent head restraint assembly, generally designated 22, configured for use in a bucket seat and the bench seat 20 incorporates a transparent head restraint assembly, generally designated 24, configured for use in a bench seat. Because each bucket seat 16, 18 is identical, only the left side bucket seat 16 will be discussed, but it is understood that corresponding structures are also present on the right side bucket seat 18.

The bucket seat 16 includes a seat cushion assembly 26 mounted in a conventional manner to a riser structure 28 which is in turn mounted to a vehicle floor 30. A seat back assembly 32 is mounted in a conventional manner with respect to the seat cushion assembly 26. The two passenger bench seat 20 includes a seat cushion assembly 34 mounted on a riser member 36 secured to the vehicle floor 30 and further includes a seat back assembly 38 mounted in a conventional manner.

The transparent head restraint assembly 22 incorporated in the bucket seat 16 includes a transparent head restraint member 40 flexibly and resiliently mounted in the seat back assembly 32 thereof. The transparent head restraint assembly 24 incorporated in the bench seat 20 includes a transparent head restraint member 42 resiliently mounted in a U-shaped frame member 44 on the seat back assembly 38. The frame member 44 forms at least a portion of the outer perimeter of the head restraint assembly 24 and defines an inner opening for receiving the transparent head restraint member 42.

The transparent head restraint members 40, 42 of the respective restraint assemblies 22, 24 comprise the contact surfaces for the back of a seat occupant's head when occupying the respective vehicle seats 16, 18, 20 during a vehicle accident. The restraint member 42 mounted with respect to the bench seat 20 will be considered in detail first. The restraint member 42 can be constructed of plastic, glass or a combination thereof, but the preferred material is a polycarbonate plastic. The restraint member 42 is a hard, shatter-proof and transparent structure. The restraint member 42 is mounted to the seat back assembly 38 using a resilient mounting structure to provide a high degree of cushioning to protect the occupant's head and neck should the seat occupant's head strike the restraint member 42 during an accident. The details of this resilient mounting are shown in FIG. 4.

Figure 4:
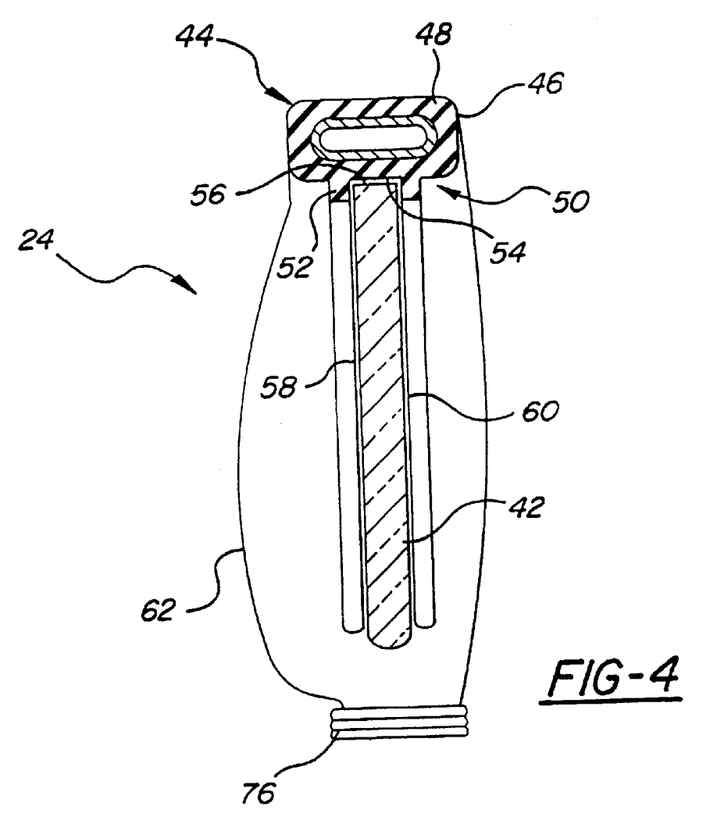
FIG. 4 is a sectional view of a transparent head restraint assembly taken along line 4—4 of FIG. 3.

Referring to the cross section in FIG. 4, a tubular member 46, preferably made of metal, provides structural support for the U-shaped frame member 44. The tubular member 46 is U-shaped and extends through the entire U-shaped frame member 44. The free ends (not shown) of the U-shaped tubular member 46 are rigidly secured to a metal frame (not shown) of the seat back assembly 38. Any conventional method can be used to secure the tubular member 46 to the frame of the seat back assembly 38, but the preferred method is by welding. Alternatively, the tubular member 46 could be a continuous integral part of the frame structure of the seat back assembly 38.

The U-shaped tubular member 46 is surrounded by a resilient, flexible elastomeric material forming a padding structure 48. The elastomeric material of the padding structure 48 provides a soft outer covering for the frame member 44 to protect passengers in the event of an accident by cushioning direct passenger contact with the metal tubular member 46. The elastomeric material of the padding structure 48 is preferably molded around the U-shaped tubular member 46 during the manufacturing process. A mounting structure 50 for mounting the restraint member 42 has a pair of spaced apart fingers 52 forming a groove 54 in the molded elastomeric material of the padding structure 48 to receive an edge 56 and portions of the front and rear surfaces 58, 60 of the restraint member 42. Preferably, the restraint member 42 is secured by gluing the restraint member 42 within the groove 54 using any appropriate adhesive compound. Many elastomeric compounds having adequate resilient qualities can be used as the padding structure 48 and mounting structure 50, including rubber, foam rubber, and other suitable materials.

It is to be understood that the mounting structure 50 and the padding structure 48 need not be formed as one piece, although it is preferable. The mounting structure 50 may be formed separately and from a different material from the padding structure 48. The function of the two are separate from one another, but may be embodied in one molded piece as described herein. The padding structure 48 serves to prevent a passenger from being injured by the metal tubular member 46. The mounting structure 50 provides resilient mounting for the transparent head restraint member 42 so that it absorbs the shock of a passenger's head impacting the restraint member 42.

Because the mounting structure 50 is made of a flexible elastomeric material, the restraint member 42 will resiliently move relative to the rigid tubular member 46 when the seat occupant's head impacts the restraint member 42 during an accident or sudden deceleration. The restraint member 42 will then resiliently return to its pre-impact position by virtue of the resilient mounting structure 50. The elastomeric material of the padding structure 48 can also be molded to form side support structures 62 that provide lateral support for the occupant's head and neck which helps prevent the occupant's head from coming in contact with a vehicle side window 64 during an accident, particularly an accident involving an angular impact. It can be appreciated that because the elastomeric material 48 is molded over the tubular member 46, there are no sharp edges or corners on the frame member 44 that could injure an occupant during a vehicular accident.

While the preferred material for constructing the transparent head restraint member 42 is a polycarbonate plastic, the restraint member 42 may be formed from any transparent plastic, glass, or plastic and glass combination that meets the performance specifications for the head restraint system. Failure of the transparent head restraint member 42 under an excessive load must not result in fragmentation of the restraint member 42 which could injure an occupant. It is contemplated that any shatter resistant transparent material which achieves the desired performance specifications can be used in the head restraint assembly 24 of the bench seat 20.

Because the restraint member 42 is transparent, a vehicle driver has a relatively unobstructed view out a rear window 66 of the vehicle 10. For example, the driver's visual path using a rear mirror 68 is represented in phantom in FIG. 1 and is designated at 69.

Figure 2:
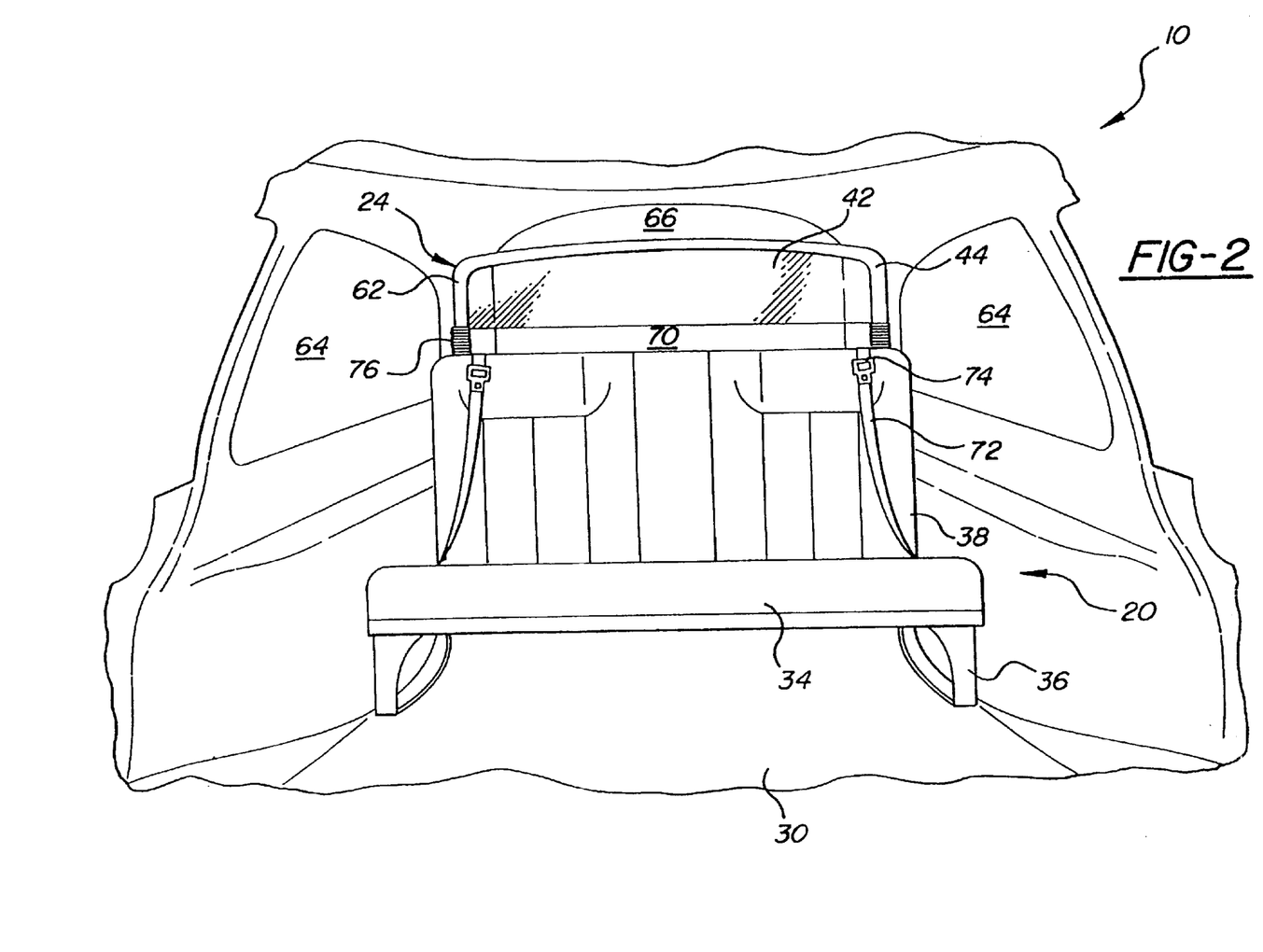
FIG. 2 is a perspective view of the bench seat in the second row of vehicle seating as in FIG. 1.

As shown in FIG. 2, the frame member 44, 46, 48, 50 has a low profile and offers little visual obstruction for a driver looking through the rear window 66. An opening 70 between the restraint member 42 and the seat back assembly 38 facilitates air circulation in the vehicle and provides a passage for a shoulder harness portion 72 of a conventional seat belt assembly 74. Grip structures 76 on the lower portions of the soft frame 44 help passengers enter and exit the bench seat 20. The grip structures 76 and padding structure 48 are preferably integrally formed in the elastomeric material during fabrication of the frame member 44.

Figure 3:
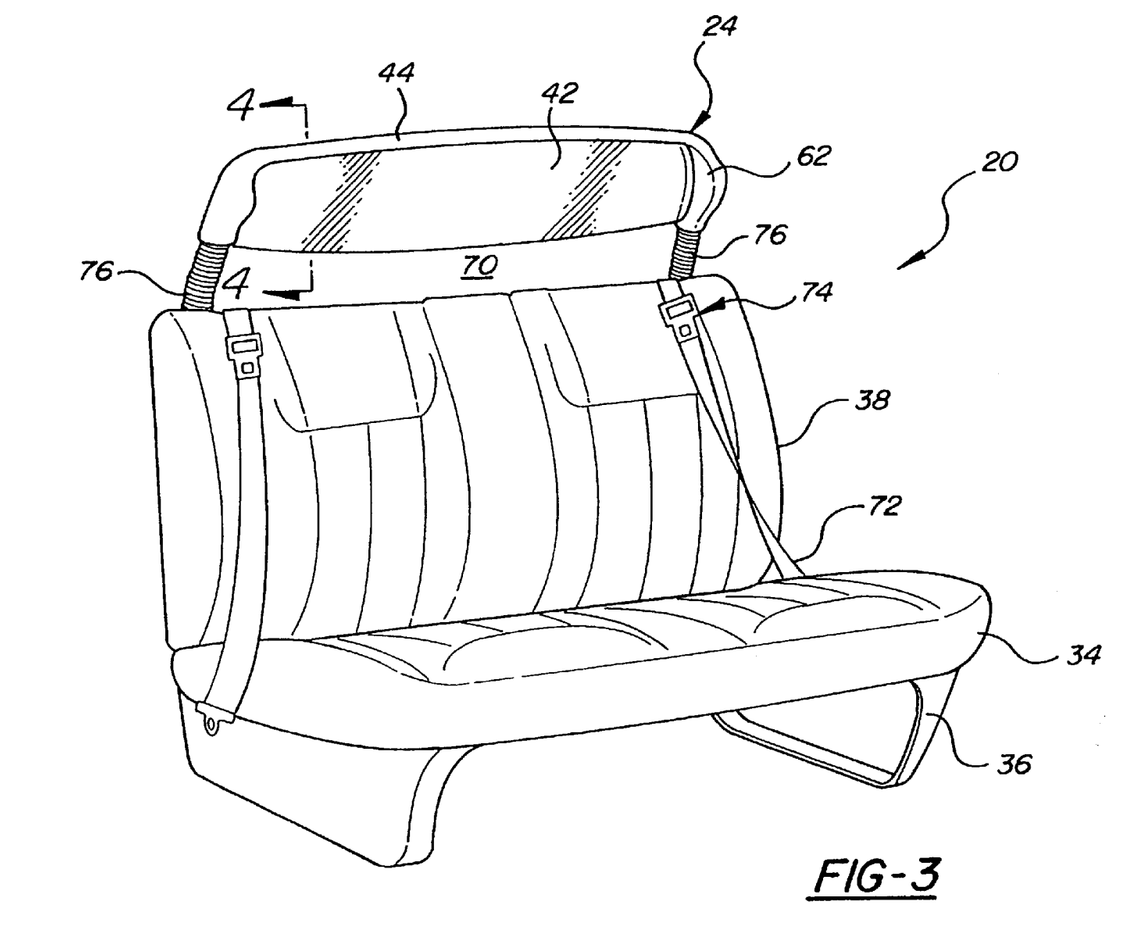
FIG. 3 is a isolated perspective view of the bench seat of FIG. 1.

The bench seat 20 is shown in isolation in FIG. 3. It can be appreciated that because the position of the restraint member 42 is not vertically adjustable, the restraint member 42 cannot be moved to a position where it is ineffective to protect a passenger's head and neck in case of an accident, as may be the case where passengers of varying heights use a particular seat without first adjusting the position of the head restraint assembly to proper height. Thus, the restraint member 42 is always in position to prevent injury to a passenger. The vertical height of the restraint member 42 can be constructed to be any height desired without interfering with the driver's rear vision. Because the vertical height of the restraint member 42 can be constructed to be any desired height, the head restraint assembly 24 can be configured to accommodate a wider range of passenger heights than conventional headrest assemblies.

Furthermore, because the restraint member 42 is transparent, it can span across the length of the seat back assembly 38. In conventional bench seats, two or three separate head restraints are provided with substantial spaces there between. Unlike this conventional arrangement, the head restraint assembly 24 of the present invention has no spaces, thereby avoiding the situation where passengers' heads pass between separated head restraints due to angular impact or because the passenger is not seated directly in front of the head restraint.

Figure 5:
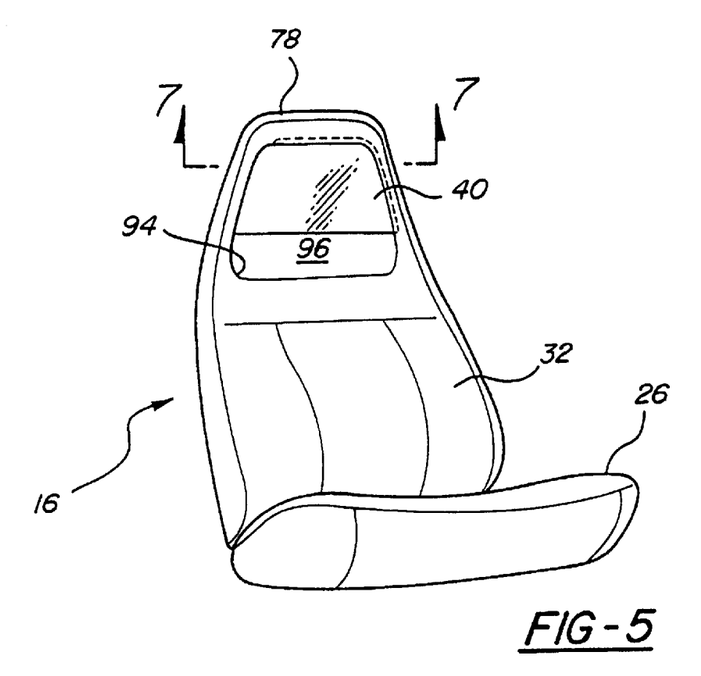
FIG. 5 is an isolated perspective view of a portion of a bucket seat of FIG. 1 showing a transparent head restraint assembly thereof.
Figure 6:
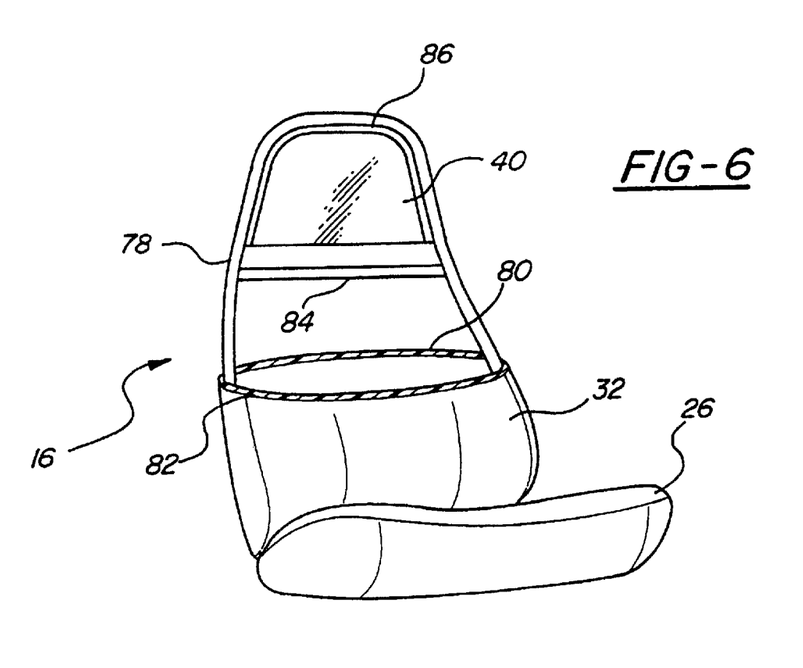
FIG. 6 is a fragmentary isolated perspective view of the bucket seat of FIG. 5.

FIG. 5 shows an enlarged isolated view of the bucket seat 16 which incorporates the head restraint assembly 22. The restraint member 40 can be comprised of the same material as the restraint member 42. The transparent head restraint member 40 is disposed in an opening 94 defined by the seat back assembly 32 and is resiliently mounted to the seat back assembly 32 such that the restraint member 40 acts as the restraint surface for the seat occupant's head during a collision. FIG. 6 shows a fragmentary view of the seat back assembly 32. More specifically, the seat back assembly 32 is comprised of a frame structure 78 which is surrounded by a foam-like material or pad 80 covered by a trim cover member 82 typically made of cloth, leather, or vinyl. The seat back assembly 32 also includes a cross member 84 secured to the frame structure 78. The frame structure 78 and cross member 84 are typically of tubular metal construction and the cross member 84 is secured to the frame structure 78 in a conventional manner, such as by welding. The upper portion of the frame structure 78 as shown in FIG. 7 includes a tubular member 86 surrounded by a plastic mounting structure 88 in which the restraint member 40 is resiliently mounted in a manner described herein below.

Figure 7:
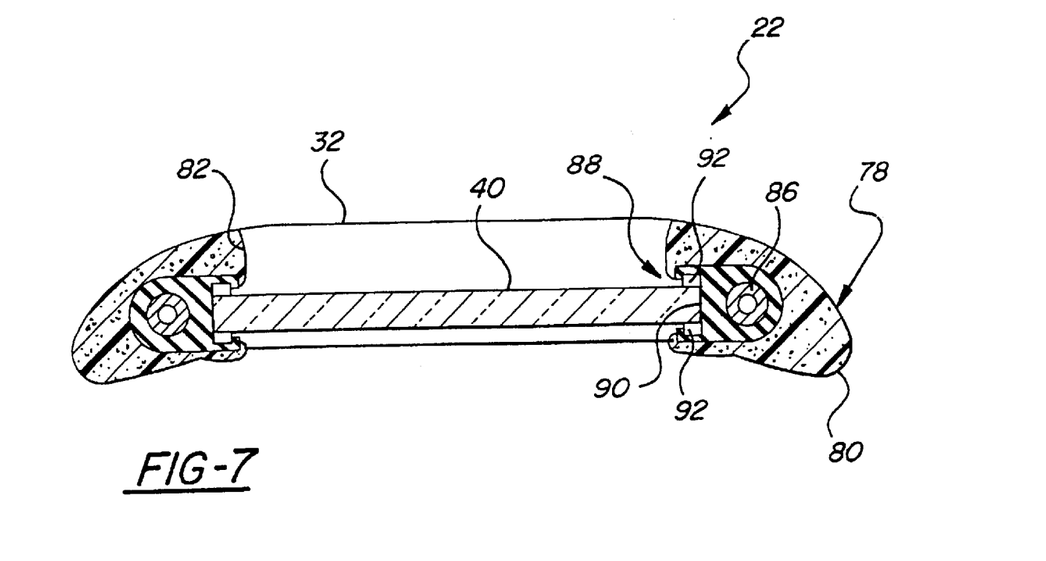
FIG. 7 is a sectional view taken along line 7—7 of FIG. 5.

The structural details of the mounting of the restraint member 40 within the seat back assembly 32 are shown in FIG. 7. The mounting structure 88 is molded from plastic around the tubular member 86 and has a groove 90 which receives the restraint member 40. A plurality of corrugated spring structures 92 provide resilient support for the restraint member 40 within the groove 90. Corrugated spring structures 92 are well known to those skilled in the art and each such spring structure 92 is generally comprised of a resilient thin metal band which assumes, in a non-compressed state, a corrugated configuration characterized by a plurality of regular, continuous curves resembling a continuous sinusoidal pattern in cross section. In a compressed state, the corrugated spring structure 92 is relatively flatter, but resiliently returns to its original shape when the compressive force is removed.

In this embodiment, the mounting structure 88 is relatively stiff and inflexible. The impact force is absorbed primarily by the corrugated spring structures 92 and the mounting structure 88 provides a stiff frame structure against which the spring structures 92 are compressed. During impact, the corrugated spring structures 92 are compressed to allow the restraint member 40 to resiliently move with respect to the mounting structure 88 and cushion the impact of the passenger's head. When the bucket seat 16 is not occupied, the transparent nature of the material used to make the restraint member 40 affords increased visibility for passengers seated behind in the second row 14.

A similar construction may be used in the head restraint assembly 24 of the bench seat 20. Specifically, the resilient mounting structure 50 could be replaced with a stiff plastic material and a plurality of corrugated springs could be mounted therein to absorb the shock of a passenger's head striking the restraint member 42. Likewise, the construction of the head restraint assembly 24 of FIG. 4 could be modified for use on the bucket seat 16 as described below with respect to FIG. 7A.

Figure 7A:
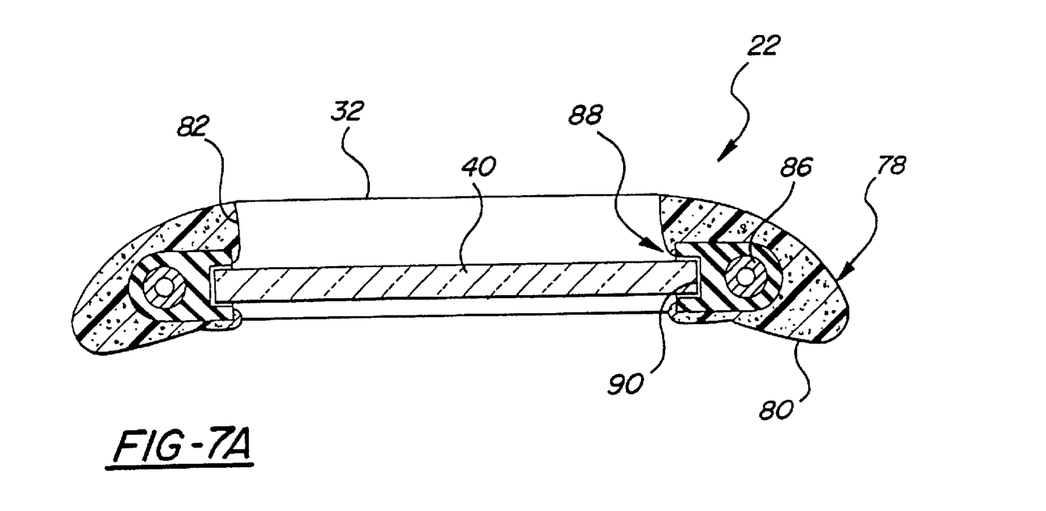
FIG. 7A is a sectional view similar to the sectional view of FIG. 7 showing an alternate embodiment of the transparent head restraint assembly of FIG. 5.

FIG. 7A shows an alternative embodiment of the head restraint assembly 22. In this embodiment, the plastic material of the mounting structure 88 is molded around the tubular member 86 and forms a groove 90 in which the restraint member 40 is secured by a conventional adhesive compound. The mounting structure 88 is made from an elastomeric material such that it is relatively flexible and resiliently pliable. During impact, the elastic deformation of the mounting structure 88 allows the restraint member 40 to resiliently move with respect to the frame member 78 and cushion the impact for the passenger in a manner much like that of the head restraint assembly 24 described above with respect to FIG. 4.

FIGS. 5, 8, 9, and 10 show that the restraint member 40 can be of various shapes and can be secured to the seat back assembly 32 in various configurations. In each of FIGS. 5 and 8–10, the restraint member 40 is secured within an opening, generally designated 94, in the seat back assembly 32. In FIG. 5, three sides of the restraint member 40 are secured in an upper portion of the seat back assembly 32 within the opening 94 in a manner similar to that shown in FIGS. 7 and 7A. A gap 96 is formed at the bottom of the opening 94 to allow air to flow there through.

Figure 8:
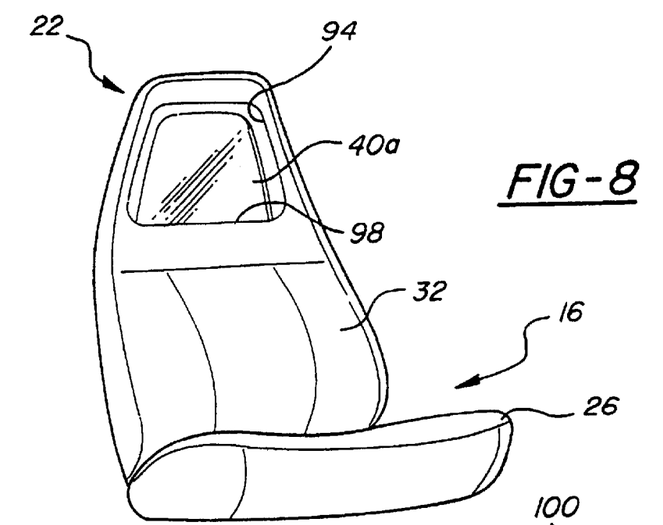
FIG. 8 is an isolated perspective view of a portion of a bucket seat similar to the view of FIG. 5 showing a second embodiment of the transparent head restraint assembly shown therein.

In FIG. 8 the restraint member 40a is secured the seat back assembly 32 at a bottom edge 98 of the opening 94 through resilient attachment to the cross member 84 (not shown in FIG. 8) by a mounting structure similar to that described above with respect to FIGS. 7 and 7A. The flexible attachment of the restraint member 40a to the cross member 84 is made stiff enough to preclude the possibility that the exposed upper edge of the restraint member 40a emerges from the rear of the opening 94, thus assuring that a passenger seated behind the seat will not come in contact with the exposed edge of the restraint member 40a. Furthermore, the cantilever-type attachment allows the restraint member 40a to flexibly bend and absorb some of the shock of a passenger impact.

Figures 9, 10:
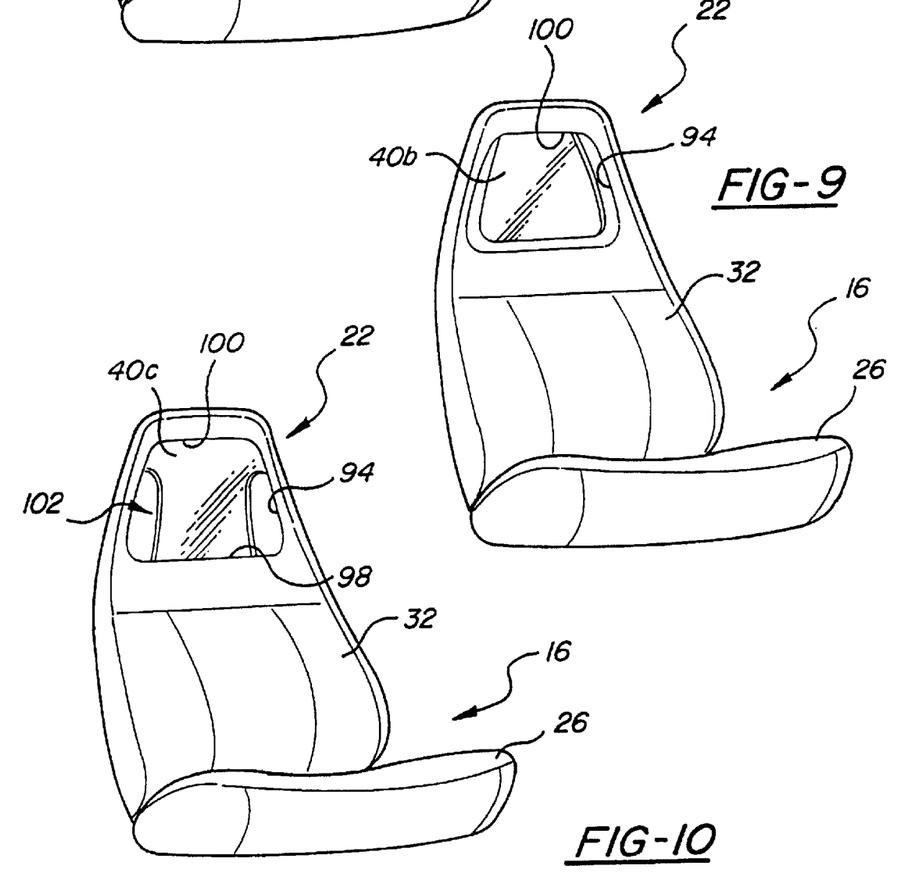
FIG. 9 is an isolated perspective view of a portion of a bucket seat similar to the view of FIG. 5 showing a third embodiment of the transparent head restraint assembly shown therein.
FIG. 10 is an isolated perspective view of a portion of a bucket seat similar to the view of FIG. 5 showing a fourth embodiment of the transparent head restraint assembly shown therein.

In FIG. 9, the restraint member 40b is secured to the seat back assembly 32 at a top edge 100 of the opening 94 by resiliently attaching it to an upper horizontal portion of the frame member 78 (not shown in FIG. 9) with a mounting structure similar to that described above with respect to FIGS. 7 and 7A.

In FIG. 10, the restraint member 40c is secured to the seat back assembly 32 at the top 100 and bottom 98 edges of the opening 94 by resiliently attaching it between the frame member 78 and the cross member 84 (not shown in FIG. 10) in a manner similar to the mounting of the restraint member illustrated in FIGS. 7 and 7A. Restraint member 40c is generally wedge-shaped with rounded corners and is provided with recessed areas that cooperate with the sides of the opening 94 to form symmetrical lateral openings 102. These lateral openings 102 permit increased airflow around the sides of the occupant's head and shoulders.

In each configuration shown in FIGS. 5 and 8–10, each restraint member 40, 40a–c is secured to the frame member 78 or cross member 84 using flexible elastomeric material and an adhesive compound. Alternatively, the restraint member 40b, 40c in the embodiments shown respectively in FIGS. 8 and 9 could be rigidly secured to the cross member 84 or the frame member 78, respectively, and the resilient cushioning may be provided by the restraint member 40b, 40c itself. More specifically, the restraint member 40b, 40c could be constructed to bend and absorb the impact of an occupants head. Thus, this resilient bending alone could provide sufficient cushioning for the head restraint to meet design requirements.

It can be appreciated that the flexation pattern and the amount of flexation of the restraint member 40, 40a–c in the embodiments shown in FIGS. 5 and 8–10 will vary because the manner of attachment thereof to the seat back assembly 32 varies. The embodiments shown in FIGS. 5 and 10 will allow relatively less resilient bending of the restraint member with respect to the frame member 78 and cross member 84 because the sides of the restraint member are secured to the seat back assembly 32. The mounting of the restraint member in FIGS. 8 and 9 will allow relatively more bending of the restraint member with respect to the frame member 78 and cross member 84 because only one side of the restraint member is secured in these embodiments. This results in a different degree of cushioning for the passenger's head and a bending movement of the restraint member 40 with respect to the attached edge thereof.

Figure 11:
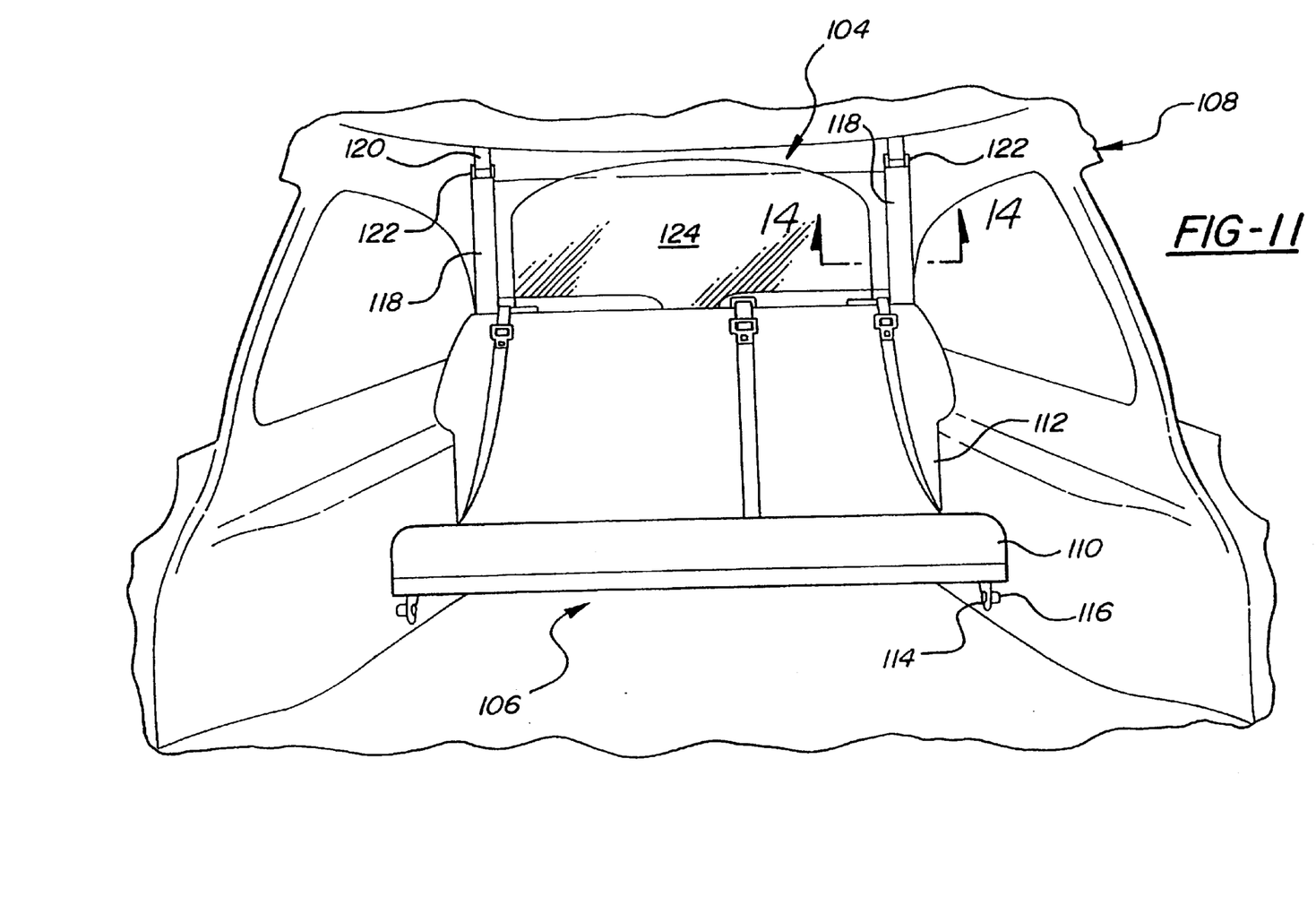
FIG. 11 is a fragmentary perspective view of the interior of a sports utility-type vehicle showing a removable bench seat therein which incorporates a transparent head restraint assembly in accordance with the present invention.

FIG. 11 shows a transparent head restraint assembly, generally designated 104, configured for use with a removable seat 106 in a sports utility-type vehicle, generally designated 108. The seat 106 includes a seat cushion assembly 110 and a seat back assembly 112 pivotally mounted thereto. The seat cushion assembly 110 is provided with releasable latch members, generally designated 114, which releasably lock around support structures 116 secured to the sides of the interior of the vehicle 108. The seat back assembly 112 is also provided with vertical support members 118 which secure the seat back assembly 112 to latch structures 120 secured to a roof rail.

More specifically a striker member 122 (in the form of a hasp) at the distal end of each vertical support member 118 releasably lockably engages a corresponding latch structure 120.

A transparent head restraint member 124 is resiliently mounted to the vertical support members 118 and to a central portion of the seat back assembly 112. The general structure and operation of the seat 106 is similar to one without a transparent head restraint assembly as described in WO 98/41419.

Figure 12:
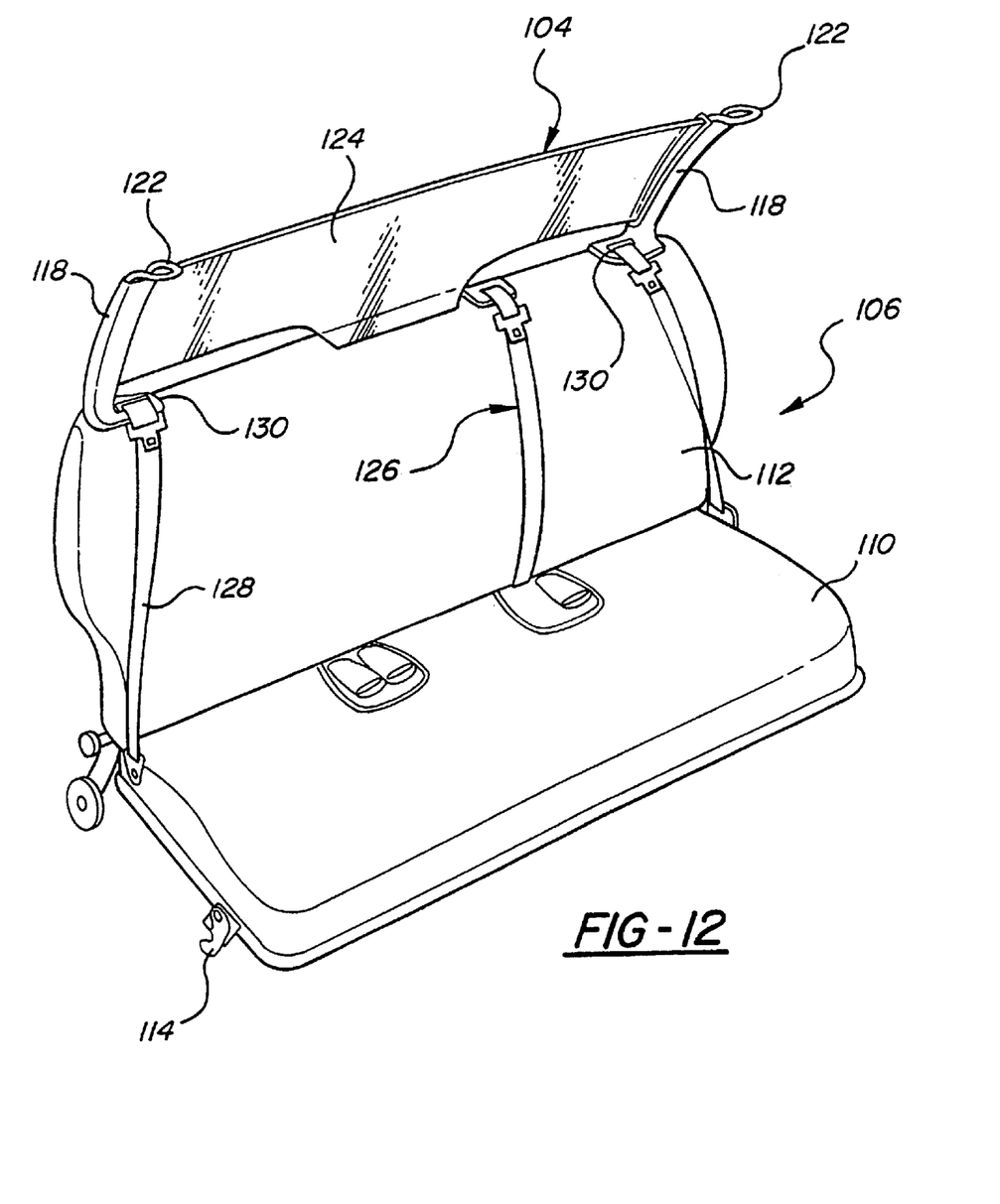
FIG. 12 is an isolated perspective view of the removable bench seating of FIG. 11.

The removable seat 106 is shown in isolation in FIG. 12. It can be appreciated that the bench seat 106 seats three occupants and includes three seat belt assemblies 126. The shoulder harness strap members 128 for two of the seat belt assemblies 126 extend through slots 130 formed in portions of the vertical support members 118. FIG. 12 shows that the restraint member 124 is slightly curved forwardly towards the seat cushion assembly 110.

Figure 13:
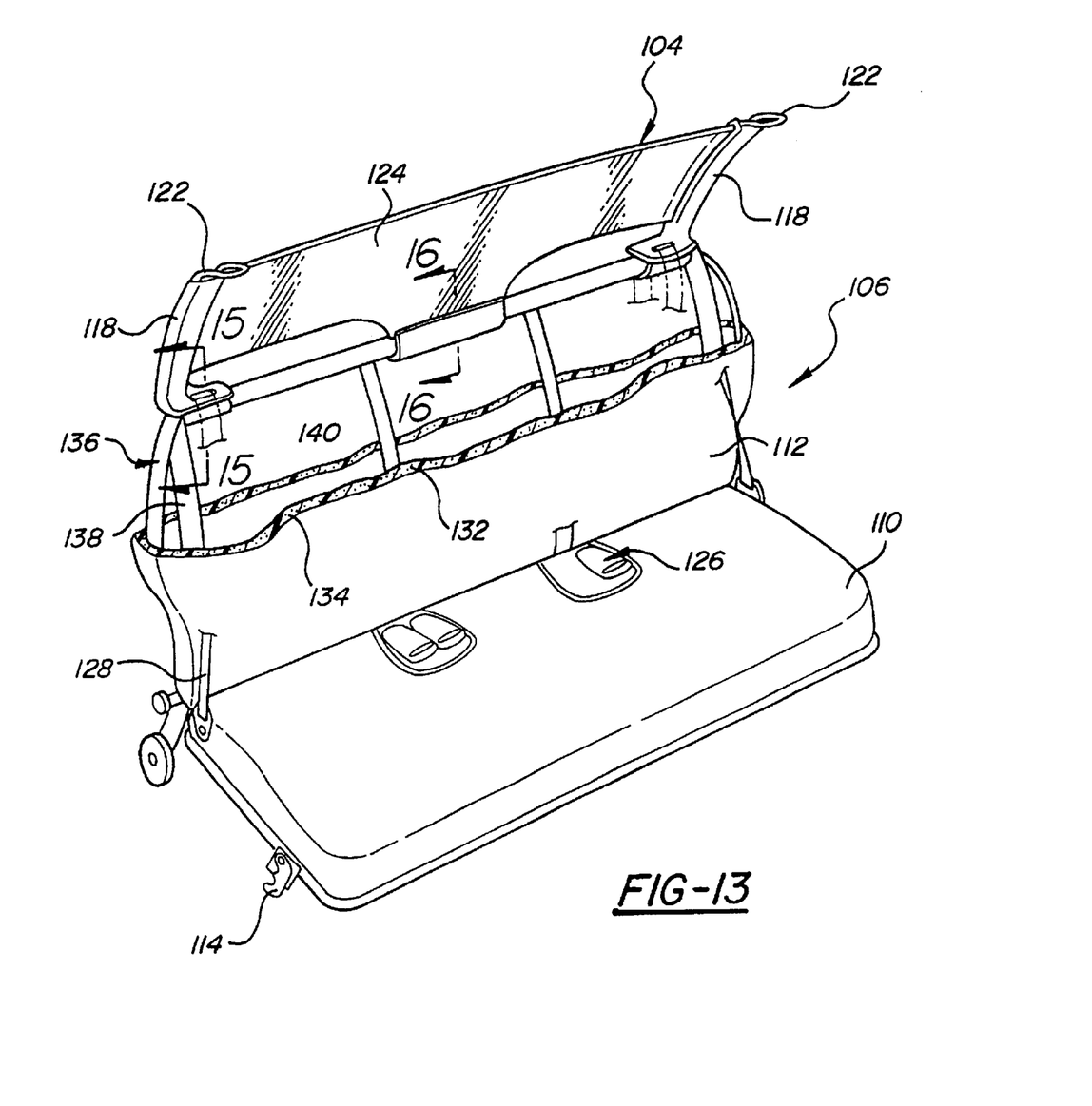
FIG. 13 is a fragmentary perspective view of the removable bench seat of FIG. 12.

FIG. 13 shows the removable seat 106 with the foam cushion 132 and the cover 134 of the seat back assembly 112 in fragmentary view to reveal the frame structure 136. The frame structure 136 includes vertical end supports 138 and a horizontal cross support 140 which are each of a tubular metal construction and are secured together by welding or any other means known to one skilled in the art.

Figure 14:
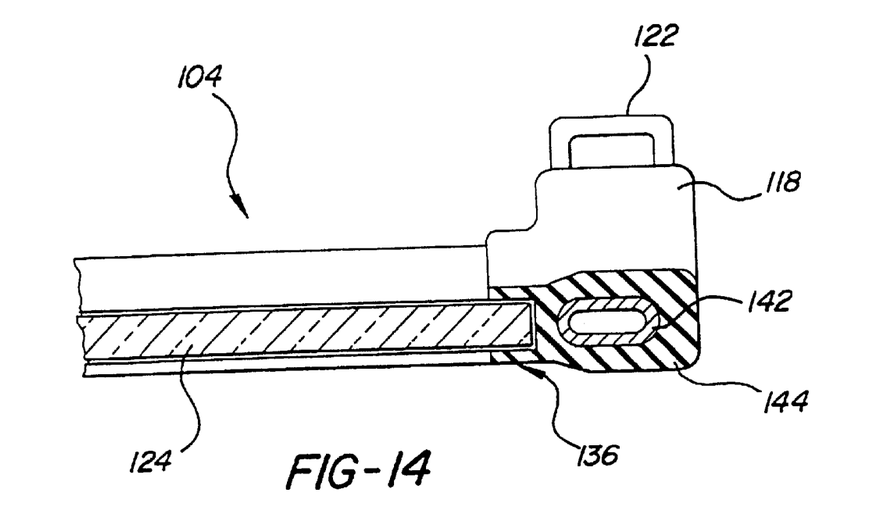
FIG. 14 is a fragmentary sectional view of the transparent head restraint assembly taken along line 14—14 of FIG. 11.

FIG. 14 shows that the vertical support member 118 is comprised of a tubular member 142, preferably made of metal, which is surrounded by a padding structure 144 molded from resilient elastomeric material. The restraint member 124 is secured with an adhesive compound or by any other suitable means within a mounting structure 146. The tubular member 142 is rigidly secured to the cross support 140, preferably by welding. It is to be understood that the mounting structure 146 may be formed separate from the padding structure 144 surrounding the tubular member 142. All that is desired is that the mounting structure 146 have resilient characteristics to adequately absorb the impact of a passenger striking the restraint member 124.

Figure 15:
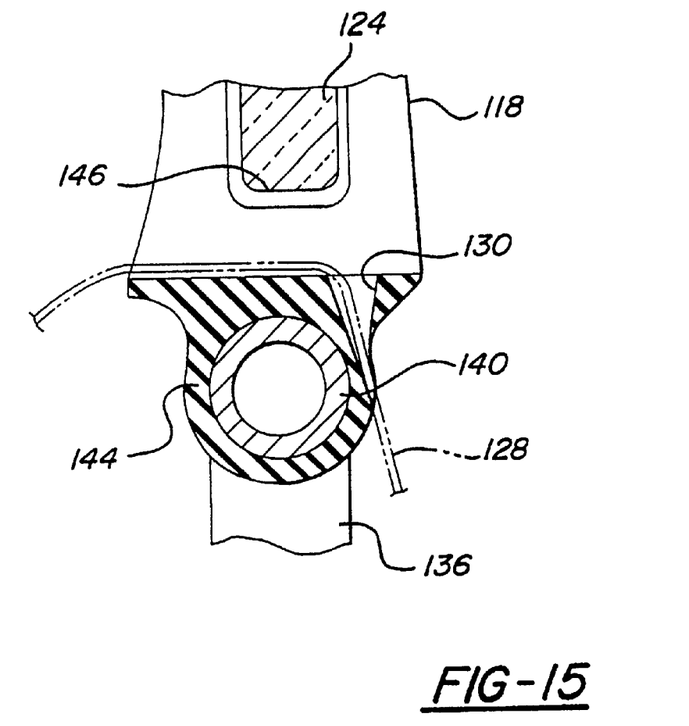
FIG. 15 is a fragmentary sectional view of the transparent head restraint assembly taken along line 15—15 of FIG. 13.

FIG. 15 shows that the padding structure 144 which forms the exterior surface of the vertical support member 118 surrounds a portion of the cross support 140. It can be appreciated that the padding structure 144 which surrounds the cross support 140 and that which surrounds the tubular member 142 is preferably one integral piece of elastomeric material and provides a continuous padded surface which protects occupants from the rigid surfaces of the frame structure 136 and the tubular member 142 in the vertical support member 118.

Figure 16:
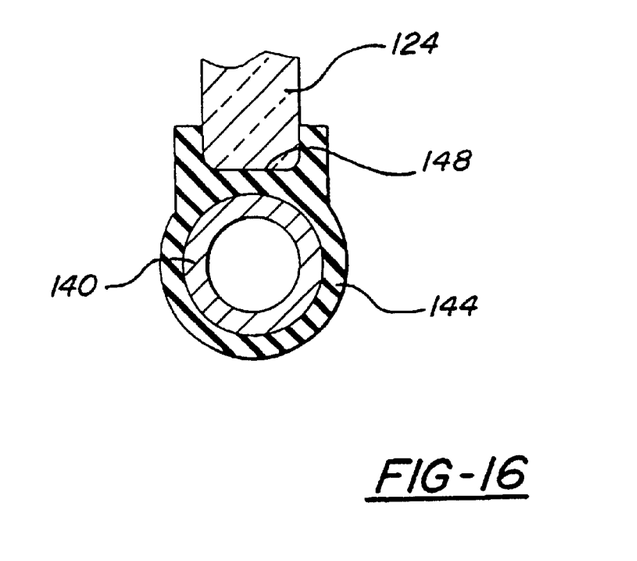
FIG. 16 is a fragmentary sectional view of the transparent head restraint assembly taken along line 16—16 of FIG. 13.

The details of the central area of attachment of the head restraint member 124 to the cross support 140 are shown in FIG. 16. The padding structure 144 surrounds the cross support 140 and the head restraint member 124 is secured within a mounting structure 148 with an adhesive compound. Either mounting structure 146, 148 may be formed of a stiff material and shock absorbing structures such as elastomeric inserts or corrugated spring, as discussed above with respect to FIG. 7, may be inserted between the member 124 and the mounting structures 146, 148.

If a seat occupant's head impacts the restraint member 124, the elastomeric material of the mounting structures 146, 148 resiliently flexes to permit relative movement of the restraint member 124 with respect to the vertical support members 118 and the frame structure 136. This relative movement provides the shock absorbency necessary to protect the occupant during an accident.

The resilient mounting of the transparent head restraint member 124 provides a low impact surface for the seat occupant's head and neck in the event of a collision. The preferred material for the restraint member 124 is a transparent polycarbonate plastic, as this material is lightweight and resists aggressive fragmentation upon impact. The vertical height of the restraint member 124 can be made high enough so that the upper edge thereof is close to the roof rail and the lower edge is proximate the seat back assembly 112. This large vertical height provides total restraint for all sizes of seat occupants and protects passengers in accidents involving all angles of impact. Because the upper and lower edges of the restraint member 124 are close to the roof rail and seat back assembly 112, respectively, and because the side edges of the restraint member 124 are secured within the mounting structures 146, 148, there is little chance of occupant contact with an edge of the restraint member 124 which could result in injury during an accident.

A small elongated opening is provided between the seat back assembly 112 and the restraint member 124 on each side of the bench seat 106. These openings allow air circulation in the vehicle 108 and provide a space for the shoulder harness strap members 128. The transparent head restraint assembly 104 can be used in a bench seat 106 which is removably mounted in either the second or third row of the vehicle 108, but is preferably used in the third row of seating. It is also contemplated that the transparent head restraint assembly 104 of any construction described herein above may be used in other types of seats not described in detail herein.

In each embodiment, the transparent panel (restraint member 40, restraint member 42 and restraint member 124), which may be plastic or glass or some combination thereof, provides the properties which, together with the manner of mounting the transparent panels 40, 42, 124, achieves the desired performance specifications and absorbs the impact of a passenger's head striking the panels 40, 42, 124, thereby minimizing injury to the head and neck. The manner of mounting the transparent panels 40, 42, 124 in the head restraint assemblies 22, 224, 104 also ensures that there is no head contact with an unprotected edge of the transparent panels 40, 42, 124. This is particularly important for front and second row vehicle seating because impact is possible from both the front and rear of such seating and because these seats may vary in location and attitude.

It is further contemplated that these panels 40, 42, 124 can be molded to provide angled or curved surfaces which provide deflection of the occupant's head in the event of impact. The transparent head restraint assemblies 22, 24, 104 according to the present invention can be configured for use in any seat in the vehicle, but it is particularly effective on a third row, three-passenger bench seat.

The invention has been described in an illustrative manner, and it is to be understood that the terminology which has been used is intended to be in the nature of words of description rather than of limitation. It is now apparent to those skilled in the art than many modifications and variations of the present invention are possible in light of the above teachings. It is, therefore, to be understood that, within the scope of the appended claims, the invention may be practiced other than as specifically described.

What is claimed is:

1. A transparent head restraint assembly for use on a vehicle seat comprising:

a frame member adapted for securing said head restraint assembly to the vehicle seat, said frame member forming an outer portion of said head restraint assembly and defining an inner opening;

a transparent head restraint member seated in said opening of said frame member; and a mounting structure disposed between said transparent head restraint member and said frame member for securing said transparent head restraint member to said frame member;

said head restraint assembly characterized by said mounting structure having a resilient portion forming a groove and said head restraint member secured within said groove to provide a resilient mounting for said head restraint member such that said mounting structure absorbs forces impacting said restraint member.

2. A transparent head restraint assembly as set forth in claim 1 wherein said frame member includes a rigid tubular member for providing structural support of said head restraint assembly and a resilient padding structure surrounding said tubular member for cushioning said frame member.

3. A transparent head restraint assembly as set forth in claim 2 wherein said resilient portion includes a pair of spaced apart fingers extending from said padding structure into said opening and forming said groove there between for receiving and securing said transparent head restraint member therein.

4. A transparent head restraint assembly as set forth in claim 3 wherein said mounting structure is a flexible elastomeric material for providing resilient mounting of said transparent head restraint member to said frame member, whereby said mounting structure absorbs shock from an impact on the transparent head restraint member.

5. A transparent head restraint assembly as set forth in claim 3 wherein said mounting structure further includes a dampener seated in said groove between each of said fingers and opposing sides of said transparent head restraint member for flexing and absorbing shock from an impact on the transparent head restraint member.

6. A transparent head restraint member as set forth in claim 5 wherein said dampener is a corrugated spring structure.

7. A transparent head restraint member as set forth in claim 3 wherein said resilient portion and said padding structure form a integral solid body.

8. A transparent head restraint member as set forth in claim 7 wherein said transparent head restraint member is a thin solid sheet of polycarbonate plastic.

9. A transparent head restraint member as set forth in claim 8 wherein said padding structure is resilient, flexible elastomeric material.

10. A transparent head restraint assembly as set forth in claim 9 wherein said frame member is generally U-shaped forming the outer perimeter of said head restraint assembly.

11. A vehicle seat comprising;

a seat cushion assembly;

a seat back assembly mounted to the seat cushion assembly; and a transparent head restraint assembly, said transparent head restraint assembly including;

a frame member adapted for securing said head restraint assembly to the seat back assembly, said frame member forming an outer portion of said head restraint assembly and defining an inner opening;

a transparent head restraint member seated in said opening of said frame member; and a mounting structure disposed between said transparent head restraint member and said frame member for securing said transparent head restraint member to said frame member;

said head restraint assembly characterized by said mounting structure having a resilient portion forming a groove and said head restraint member secured within said groove to provide a resilient mounting for said head restraint member such that said mounting structure absorbs forces impacting said restraint member.

12. A vehicle seat as set forth in claim 11 wherein said frame member includes a rigid tubular member for providing structural support of said head restraint assembly and a resilient padding structure surrounding said tubular member for cushioning said frame member.

13. A vehicle seat as set forth in claim 12 wherein said resilient portion includes a pair of spaced apart fingers extending from said padding structure into said opening and forming said groove there between for receiving and securing said transparent head restraint member therein.

14. A vehicle seat as set forth in claim 13 wherein said mounting structure is a flexible elastomeric material for providing resilient mounting of said transparent head restraint member to said frame member, whereby said mounting structure absorbs shock from an impact on the transparent head restraint member.

15. A vehicle seat as set forth in claim 13 wherein said mounting structure further includes a dampener seated in said groove between each of said fingers and opposing sides of said transparent head restraint member for flexing and absorbing shock from an impact on the transparent head restraint member.

16. A vehicle seat as set forth in claim 15 wherein said dampener is a corrugated spring structure.

17. A vehicle seat as set forth in claim 13 wherein said resilient portion and said padding structure form a integral solid body.

18. A vehicle seat as set forth in claim 17 wherein said transparent head, restraint member is a thin solid sheet of polycarbonate plastic.

19. A vehicle seat as set forth in claim 18 wherein said padding structure is resilient, flexible elastomeric material.

20. A vehicle seat as set forth in claim 19 wherein said frame member is generally U-shaped forming the outer perimeter of said head restraint assembly.

* * * * *